United States Patent [19]

Knauer

[11] 4,056,836

[45] Nov. 1, 1977

[54] METHOD AND APPARATUS FOR INTERRUPTING LARGE CURRENT

[75] Inventor: Wolfgang Knauer, Malibu, Calif.

[73] Assignee: Hughes Aircraft Company, Culver City, Calif.

[21] Appl. No.: 669,553

[22] Filed: Mar. 23, 1976

[51] Int. Cl.$^2$ .............................................. H02H 7/22

[52] U.S. Cl. .............................................. 361/4; 361/2

[58] Field of Search ................. 317/11 B, 11 A, 11 C, 317/11 R, 11 E, 20; 307/135, 136, 133, 137; 200/147, 144; 361/3, 4, 5, 6, 8, 58

[56] References Cited

U.S. PATENT DOCUMENTS

| | | | |
|---|---|---|---|
| 3,390,305 | 6/1968 | Greenwood | 317/11 B |
| 3,489,918 | 1/1970 | Greenwood et al. | 317/11 B X |
| 3,489,951 | 1/1970 | Greenwood | 317/11 B |
| 3,548,256 | 12/1970 | Barkan et al. | 317/11 B |
| 3,781,606 | 12/1973 | Long et al. | 317/11 C X |
| 3,868,550 | 2/1975 | Knauer et al. | 317/11 B |
| 3,912,975 | 10/1975 | Knauer et al. | 317/11 C |
| 3,935,509 | 1/1976 | Eidinger | 317/11 C X |

OTHER PUBLICATIONS

IEEE Paper T72 107-6, Printing Date Nov. 30, 1971, pp. 1570-1574, "Theory and Application of the Commutation Principle for HVDC Circuit Breakers" by Greenwood and Lee.

*Primary Examiner*—J D Miller
*Assistant Examiner*—Patrick R. Salce
*Attorney, Agent, or Firm*—Allen A. Dicke, Jr.; W. H. MacAllister

[57] ABSTRACT

Large current is interrupted against high voltage by a high speed mechanical opening line switch connected in series with a saturable reactor. A commutation capacitor is discharged through the closed switch against the line current to produce a current zero. Near the time of current zero the line switch is opened to produce arc free interruption. A *dV/dt* capacitor is paralleled around the switch to limit the rate of voltage rise. High contact speed of the line switch limits the size of the required *dV/dt* capacitor to what can be justified economically.

12 Claims, 3 Drawing Figures

METHOD AND APPARATUS FOR INTERRUPTING LARGE CURRENT

BACKGROUND

This invention is directed to a method and apparatus for interrupting large electric current against high voltage and has the potential for employing simple, economic apparatus for interruptions which formerly required more complex, sophisticated equipment. Also, current interruption occurs life expectancy.

The crossed field switch tube has been developed as a switching device which can be incorporated in a system for interrupting large DC currents, even against high voltages, and when properly applied for interrupting an AC current between its natural current zeros.

U.S. Pat. No. 3,555,960 to G.A.G. Hofmann and U.S. Pat. Nos. 3,604,977 and 3,769,537 to G.A.G. Hofmann illustrate such crossed field tube switching devices. U.S. Pat. No. 3,714,510 also to G.A.G. Hofmann further describes such a switching device in connection with a circuit breaker system.

U.S. Pat. No. Re. 27,557 to K. T. Lian and U.S. Pat. No. 3,611,031 to M. A. Lutz describe circuit breaker circuits in which such switching devices are employed.

U.S. Pat. No. 3,912,975 to W. Knauer and W. L. Dugan describes a high speed mechanical switch which was originally conceived as a shunting switch for the crossed field switch tube. The contact opening speed of this switch was found to be so high that in a suitable system it can serve as an interruptor. During the initial 200 microseconds after separation its contacts move a distance of 0.4 centimeters. This implies that with six atmospheres of $SF_6$ as insulating gas, which has a breakdown field strength of approximately 250 kV/cm, the voltage hold-off capacity of the gap increases at a rate of 0.5 kV per microsecond during contact separation. In view of the fact that the switch has two contact gaps in series, the total voltage recovery capability is 1.0 kV per microsecond. It has been discovered that such a switch, properly actuated and installed with an auxiliary circuit can interrupt large currents against high voltage without resort to a plasma atmosphere interrupting mechanism. Aspects of a suitable auxiliary circuit are discussed in a paper by Greenwood and Lee, Paper T 72 107-6 IEEE Winter Power Meeting N.Y., January 1972.

Also among the prior art are papers that discuss related switching concepts, including a paper by J. Teno, O. K. Sonju, and J.M. Lontai, of AVCO Everett Research Labs, Inc., entitled "Development of a Pulsed High-Energy Inductive Energy Storage System," published August 1973. The work was done for the Air Force Aeropropulsion Lab and carries publication No. AD 766 518. Attention is particularly called to Chapter 7. A second related paper by C. E. Swannack, R. A. Haarman, J. D. G. Lindsay, and D. M. Weldon of the Los Alamos Scientific Laboratory is entitled "HVDC Interrupter Experiments for Large Magnetic Energy Transfer and Storage Systems." This paper was presented during the Sixth Symposium on Engineering Problems of Fusion Research, San Diego, Calif., November 1975.

SUMMARY

In order to aid in the understanding of this invention it can be stated in essentially summary form that it is directed to a method and apparatus for interrupting large current against high voltage, with the apparatus including a high speed mechanical opening switch in series with a saturable reactor, and with a commutating capacitor connected to induce a current zero in the switch, with the method including the proper timing of the commutation and switch opening so that the switch begins to open substantially at a current zero to avoid excessive switch arcing.

It is thus an object of this invention to provide a system which includes a mechanical switching device so that the system is capable of interrupting large current against high voltage. It is another object to provide a mechanical switch which is properly commutated so that it opens substantially without arcing in order that the contacts are not degenerated by arc action, to produce a long life. It is another object to provide a switch which operates at such high speed that the rate of recovery voltage is high so that the parallel $dV/dt$ capacitor can be reasonable in size. It is a further object to provide a device which replaces more complex and complicated devices, and still facilitates interruption of large currents against high voltages, both in DC systems and in AC systems between natural current zeros.

Other objects and advantages of this invention will be apparent from a study of the following portion of this specification, the claims, and the attached drawings.

DESCRIPTION

Figure 1:
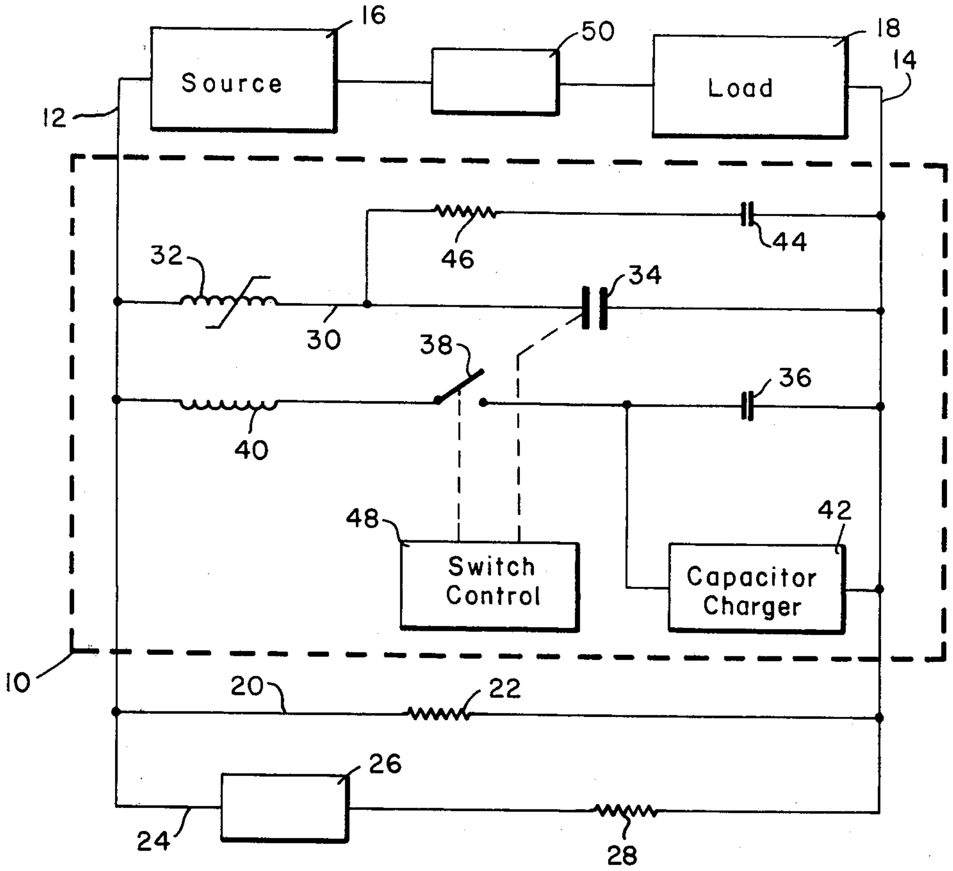
FIG. 1 is a schematic diagram of the interruption apparatus of this invention shown in connection with a circuit to be interrupted.

FIG. 1 illustrates the switching apparatus 10 as being connected between busses 12 and 14 to which source 16 and load 18 are serially connected. For example, the source supplies 10 kiloamps at 10 kV DC as normal parameters. Ignoring optional branch 20 which contains resistor 22 and optional branch 24 which contains serially connected switching apparatus 26 and resistor 28, the switching apparatus 10 is capable of off-switching all current through the source and load. Simply by opening main branch 30 through switching apparatus 10, the current flow is interrupted.

The main current flow through switching apparatus 10 is through branch 30 which contains serially connected saturable reactor 32 and mechanical switch contacts 34. As previously indicated these are mechanical contacts of a fast operating switch such as that disclosed in W. Knauer and W. L. Dugan U.S. Pat. No. 3,912,975. Serially connected together and connected in parallel to branch 30 are commutation capacitor 36, commutation switch 38, and linear reactor 40. Capacitor charger 42 is connected around capacitor 36 to provide the charge on the commutation capacitor. In parallel to main switching contacts 34 is connected the serial combination of $dV/dt$ capacitor 44 and damping resistor 46. Capacitors 36 and 44 can each have a value of 20 microfarads, while resistor 46 can have a value of 0.5 ohms. Reactor 40 can have a value of 50 microhenrys, all by way of a preferred embodiment.

The commutation circuit, comprising the loop through the commutation capacitor 36 and main switch contacts 34 is designed so that it provides the contacts of main switch 34 with a maximum opportunity for opening without arcing. Arcing can be prevented or suppressed through several methods. First, if the current through the contacts is kept below about one ampere at the moment of contact separation the current will chop and cease to flow. Second, if the voltage across the opening contacts remains below about 10 to 20 volts no arc will develop. Third, should an arc have developed during contact separation it can be extinguished during a later current zero when the gap voltage is below about 300 volts. All three methods have in common the need for low currents and/or voltages for extended periods of time, in the order of 10's of microseconds, during contact separation. This is accomplished with the aid of saturable reactor 32 in series with the main switch contacts 34. Saturable reactor 32 can have a saturated reactance of 10 microhenrys and an unsaturated reactance of 1 millihenry.

Figure 2:
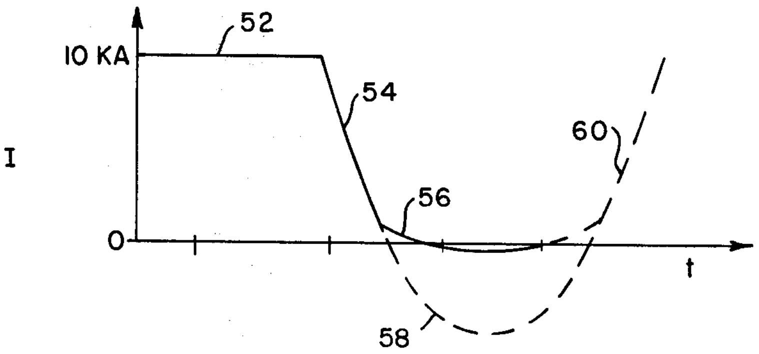
FIG. 2 is a current vs. time graph of the main circuit current during interruption.
Figure 3:
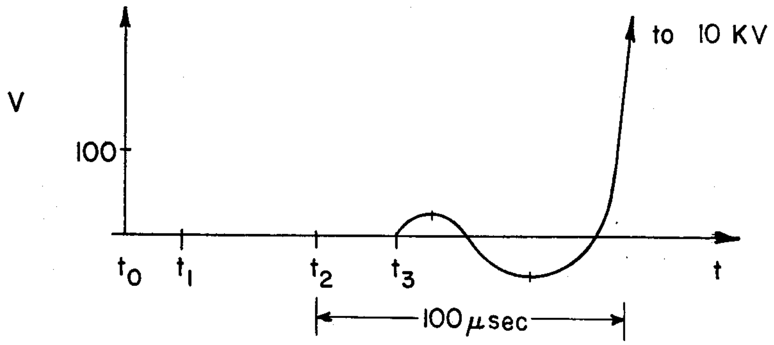
FIG. 3 is a voltage vs. time graph showing the voltage across the switching contacts during interruption.

In considering the manner in which switching apparatus 10 interrupts current, it is assumed that under initial conditions the load current is 10 kiloamperes at 10 kilovolts, at time $t_0$ at FIGS. 2 and 3, with the line current 52 (FIG. 2) flowing through saturable reactor in branch 30 and through the closed main switch contacts 34. Commutation capacitor 36 and linear reactor 40 are so dimensioned that their oscillation period is in the order of 200 microseconds, and that with commutation capacitor 36 charged to near the full circuit voltage of 10 kilovolts the oscillation current will exceed the main current by about 30%.

Switch control mechanism 48 is connected to both the commutation switch 38 and the main switch 34 to cause operation of these switches at the proper interrelated time. Upon closing of the commutation switch 38, at time $t_2$, the oscillation current will begin to flow and reduce the current along line 54 in branch 30, see FIG. 2. When the current level has fallen below the saturation level of reactor 32, an EMF is generated by reactor 32 which counteracts further rapid current changes and the current slowly passes through zero along line 56, at about time $t_3$. After flowing in the reverse direction for a time, the current will again pass through zero. Without saturable reactor the current curve would be as at 58. If uninterrupted, the current would again rise in the forward direction as shown in dotted line 60 in FIG. 2.

The switch control mechanism 48 initiates operation at time $t_1$ of the main switch to open contacts 34. In view of the internal mechanical delays in the switch mechanism the contacts do not begin to open until time $t_3$. Thus, switch control mechanism 48 is timed so that main contacts 34 begin to separate at time $t_3$ slightly prior to the first current zero. Under these circumstances the current will either chop and transfer to $dV/dt$ capacitor 44 or it will arc up to the time of the current zero and then tranfer to capacitor 44. In either case, the contacts are cleared and are ready to withstand the rising voltage on capacitor 44, see FIG. 3, as the contact gap of main switch 34 increases. To restrict the recovery voltage rise to values below 1.0 kilovolt per microsecond (for two gaps) requires a capacitor 44 having a value of two microfarads per kiloampere. In the size of the system illustrated a capacitor of 20 microfarads is required.

In some cases, particularly in AC systems, it is only necessary to insert impedance into the line to hold down fault currents to reasonable values until the usual system breaker can operate at the next current zero. It is under those circumstances that branch 20 with its impedance 22 is employed.

On the other hand in the sequential breaking of power circuits, instead of employing an impedance branch 20, a branch 24 with switch 26 and impedance 28 can be employed in parallel to switching apparatus 10. Switch 26 can be the same as switching apparatus 10. With this system, when switching apparatus 10 is turned off, the load current passes through branch 24 with impedance insertion to hold down the current, and then switch 26 is opened to open the circuit.

If it is desired that both legs of the circuit can be opened between source 16 and load 18, switch 50 of the same construction as switch 10 can be installed.

This invention having been described in its preferred embodiment, it is clear that it is susceptible to numerous modifications and embodiments within the capability of those skilled in the art. Accordingly, the scope of this invention is defined by the scope of the following claims.

I claim:

1. Switching apparatus for interrupting large current comprising:

a main branch comprising a saturable reactor, main switch contacts serially connected therewith, said main switch contacts having means connected thereto for rapidly opening said main switch contacts;

a commutation branch connected in parallel to said main branch, said commutation branch comprising the serial connection of a commutation capacitor, an inductor and a commutation switch; and means connected to control both said main switch contacts and said commutation switch for discharging commutation current through said main switch contacts to reduce current therethrough to zero and for opening said main switch contacts when the current therethrough is substantially zero.

2. The switching apparatus of claim 1 wherein a rate of voltage rise control capacitor is paralleled around said fast opening main switch contacts.

3. The switching apparatus of claim 2 wherein said main branch fast opening switch contacts open at a rate to achieve a voltage recovery rate of at least 0.5 kilovolts per microsecond.

4. The switching apparatus of claim 3 wherein a damping resistor is connected serially with said rate of voltage rise control capacitor.

5. The switching apparatus of claim 4 wherein said main branch is serially connected with a source and a load.

6. The switching apparatus of claim 1 wherein said main branch is serially connected with a source and a load.

7. The switching apparatus of claim 6 wherein said main branch fast opening switch contacts open at a rate to achieve a voltage recovery rate of at least 0.5 kilovolts per microsecond.

8. The switching apparatus of claim 7 wherein an impedance is connected in parallel with said main branch so that said impedance is inserted in series with said source and said load when said main branch fast acting switch is open.

9. Switching device of claim 7 wherein a serially connected second switch and impedance are connected in parallel to said main branch and in series with said source and said load so that when said fast opening switch in said main branch is open, load current flows through said second switch and its serially connected impedance to reduce load current and to interrupt load current when said second switch is open.

10. The switching apparatus of claim 9 wherein said second switch is substantially the same as said main switching apparatus.

11. The method of interrupting large current by means of a switching apparatus which comprises a main branch consisting of a saturable reactor connected in series with fast opening main switch contacts and a commutation capacitor dischargeable through the main switch contacts to cause a commutated zero therein comprising the steps of:

discharging the commutation capacitor through the closed main switch contacts to induce a current zero therethrough; and opening the main switch contacts substantially at the time of the current zero to interrupt current in the main branch without arcing of the main switch contacts.

12. The method of claim 11 further including the step of limiting the rate of voltage rise on said opened main switch contact to no more than 1.0 kilovolts per microsecond by properly sizing a capacitor connected in parallel to the main switch contacts.

* * * * *